US009811119B2

United States Patent
Seo

(10) Patent No.: US 9,811,119 B2
(45) Date of Patent: Nov. 7, 2017

(54) FOLDABLE ELECTRONIC DEVICE INCLUDING FLEXIBLE DISPLAY ELEMENT

(71) Applicant: SAMSUNG ELECTRONICS CO., LTD., Suwon-si (KR)

(72) Inventor: Ho-seong Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 14/468,667

(22) Filed: Aug. 26, 2014

(65) Prior Publication Data
US 2015/0055287 A1   Feb. 26, 2015

(30) Foreign Application Priority Data

Aug. 26, 2013 (KR) .......................... 10-2013-0101292

(51) Int. Cl.
*G06F 1/16* (2006.01)
*H04M 1/02* (2006.01)

(52) U.S. Cl.
CPC .......... *G06F 1/1652* (2013.01); *G06F 1/1641* (2013.01); *G06F 1/1679* (2013.01); *G06F 1/1681* (2013.01); *H04M 1/0216* (2013.01); *H04M 1/0268* (2013.01)

(58) Field of Classification Search
CPC ..... G06F 1/1652; G06F 1/1616; G06F 1/1681
USPC ........................... 361/679.21, 679.01, 679.09
See application file for complete search history.

(56) References Cited

U.S. PATENT DOCUMENTS

| 7,762,391 B2 * | 7/2010 | Jager ...................... B65G 17/38 |
| | | 198/850 |
| 8,228,667 B2 * | 7/2012 | Ma ......................... G06F 1/1652 |
| | | 361/679.01 |
| 9,176,535 B2 | 11/2015 | Bohn et al. |
| 9,235,239 B2 | 1/2016 | Van Dijk et al. |
| | (Continued) | |

FOREIGN PATENT DOCUMENTS

| CN | 1960612 A | 5/2007 |
| CN | 103034293 A | 4/2013 |
| | (Continued) | |

OTHER PUBLICATIONS

Communication dated Nov. 25, 2014 issued by the International Searching Authority in counterpart International Application No. PCT/KR2014/007807 (PCT/ISA/220/210/237).

(Continued)

*Primary Examiner* — Tuan T Dinh
*Assistant Examiner* — Rockshana Chowdhury
(74) *Attorney, Agent, or Firm* — Sughrue Mion, PLLC

(57) ABSTRACT

An electronic device includes a first and second body, a hinge unit configured to connect to the first and second body, and a flexible display disposed on the hinge unit, the first, and second body, wherein the hinge unit includes a bendable support member supported by the first and second body, and a plurality of slit members, wherein each slit member includes a fixed end that is supported by the support member and a free end that extends toward the flexible display, and wherein the plurality of slit members are arranged in a longitudinal direction relative to the flexible display and are spaced apart by an interval, wherein the free ends limit a curvature of the flexible display in a folded state by moving closer to each other and touching.

20 Claims, 17 Drawing Sheets

(56) References Cited

U.S. PATENT DOCUMENTS

| | | | |
|---|---|---|---|
| 2007/0097014 A1* | 5/2007 | Solomon | G06F 1/1616 |
| | | | 345/1.1 |
| 2007/0158376 A1 | 7/2007 | Radley-Smith | |
| 2008/0018631 A1 | 1/2008 | Hioki et al. | |
| 2009/0126155 A1 | 5/2009 | Nieuwenhuizen et al. | |
| 2012/0110784 A1* | 5/2012 | Hsu | G06F 1/1681 |
| | | | 16/226 |
| 2012/0307423 A1* | 12/2012 | Bohn | G06F 1/1641 |
| | | | 361/679.01 |
| 2013/0021762 A1* | 1/2013 | van Dijk | G06F 1/1652 |
| | | | 361/749 |
| 2013/0037228 A1 | 2/2013 | Verschoor et al. | |
| 2014/0126133 A1* | 5/2014 | Griffin | G06F 1/1652 |
| | | | 361/679.27 |
| 2016/0143162 A1 | 5/2016 | Van Dijk et al. | |

FOREIGN PATENT DOCUMENTS

| | | | |
|---|---|---|---|
| CN | 103620516 A | 3/2014 | |
| EP | 2 595 029 A1 | 5/2013 | |
| KR | 100867608 B1 | 11/2008 | |
| KR | 10-2011-0100936 A | 9/2011 | |
| KR | 10-2013-0073331 A | 7/2013 | |
| KR | 20130073331 A * | 7/2013 | G06F 1/1652 |

OTHER PUBLICATIONS

Communication dated Jul. 28, 2016, issued by the Korean Intellectual Property Office in counterpart Korean Application No. 10-2013-0101292.

Communication dated Mar. 15, 2017, issued by the State Intellectual Property Office of P.R. China in counterpart Chinese Application No. 201480057438.1.

Communication dated Apr. 24, 2017, issued by the European Patent Office in counterpart European Application No. 14838974.5.

Communication dated Aug. 21, 2017, issued by the European Patent Office in counterpart European Application No. 14838974.5.

Communication dated Sep. 11, 2017, issued by the State Intellectual Property Office of People's Republic of China in counterpart Application No. 201480057438.1.

* cited by examiner

FOLDABLE ELECTRONIC DEVICE INCLUDING FLEXIBLE DISPLAY ELEMENT

CROSS-REFERENCE TO RELATED PATENT APPLICATION

This application claims priority from Korean Patent Application No. 10-2013-0101292, filed on Aug. 26, 2013, in the Korean Intellectual Property Office, the disclosure of which is incorporated herein by reference in its entirety.

BACKGROUND

1. Field

Apparatuses and methods consistent with exemplary embodiments relate to a foldable electronic device including a flexible display element.

2. Description of the Related Art

A portable electronic device (hereinafter, referred to as a mobile device), such as a communication terminal, a game console, a multimedia player, a portable computer, or an imaging device, includes a display element that displays image information and an input unit such as a keypad, touchscreen, microphone, or camera. Some of these mobile devices may have foldable structures which may provide the ability for the mobile devices to be folded into a smaller size for portability. For example, one such mobile device may have two bodies that are connected to each other using a foldable structure. If the display element cannot be folded, then the display element may be disposed on one of the two bodies. Thus, it may be difficult to provide a display element having a large area on a mobile device having a foldable structure.

Further, as flexible display elements have been developed, attempts to apply a flexible display element to a mobile device having a foldable structure have been made. In such a case, because the flexible display element may be disposed over two bodies and across the foldable structure, a larger screen may be provided as compared to foldable mobile device that does not have a flexible display. However, when the flexible display element is sharply bent the flexible display element may be damaged. Accordingly, there is a demand for a foldable structure that may limit a radius of curvature of a flexible display element when a mobile device is folded.

SUMMARY

One or more exemplary embodiments include a foldable electronic device that may limit a curvature of a flexible display element in a folded state.

One or more exemplary embodiments include a foldable electronic device that may prevent a flexible display element from being folded in a direction opposite to a folding direction.

One or more exemplary embodiments include a foldable electronic device including a flexible display element, which may adjust an unfolding angle.

One or more exemplary embodiments include a foldable electronic device including a flexible display element, which may stably support the flexible display element when in a completely unfolded state.

Additional aspects will be set forth in part in the description which follows and, in part, will be apparent from the description, or may be learned by practice of the presented exemplary embodiments.

According to an aspect of an exemplary embodiment, there is provided an electronic device including a first body and a second body, a hinge unit configured to connect to the first body and the second body, and a flexible display disposed on the hinge unit, the first body, and the second body, wherein the hinge unit includes a support member configured to be bendable and supported by the first body and the second body, and a plurality of slit members, wherein each slit member of the plurality of slit members includes a fixed end that is supported by the support member and a free end that extends from the fixed end toward the flexible display, and wherein the plurality of slit members are arranged in a longitudinal direction relative to the flexible display and are spaced apart by a predetermined interval, wherein the free ends limit a curvature of the flexible display in a folded state by moving closer to each other and touching.

The electronic device may further include a plurality of gap-widening prevention members configured to prevent an interval between the free ends of the plurality of slit members from being greater than an interval in an unfolded state.

Each of the plurality of gap-widening prevention members may include one pair of wing portions configured to restrict free ends of first and second slit members of the plurality of slit members that are disposed adjacent to each other from being moved farther away from each other, and a connection portion configured to connect the one pair of wing portions.

The electronic device may further include first and second recesses that are recessed inward from outer surfaces of the first and second slit members and are configured to receive the one pair of wing portions.

An outer interval between the one pair of wing portions may be equal to or less than a sum of an interval between the first and second slit members and thicknesses of the first and second slit members.

Each of the first and second slit members may include a slot, on the first and second slit members, into which the connection portion is configured to be inserted, and a protrusion, on the first and second slit members, that is configured to protrude inward from at least one of both side walls of the slot and prevent the connection portion from being separated from the slot are provided.

A distance between the protrusion and a bottom of the slot may be determined such that the connection portion may be moved in an insertion direction into the slot.

The plurality of gap-widening prevention members may be integrally formed with the first and second slit members.

Each of the plurality of gap-widening prevention members may include a connection portion that extends from the first slit member to the second slit member that is disposed adjacent to the first slit member, and a wing portion that is disposed on an end portion of the connection portion and restricts the second slit member from being spaced apart from the first slit member, wherein a recess that is recessed inward from an outer surface of the second slit member and configured to receive the wing portion may be formed in the outer surface of the second slit member.

The second slit member may include a slot, in the second slit member, into which the connection portion is inserted, and a protrusion, on the second slit member, that protrudes inward from at least one of both side walls of the slot and prevents the connection portion from being separated from the slot are provided.

A distance between the protrusion and a bottom of the slot may be determined such that the connection portion can be moved in an insertion direction in the slot.

Each of the plurality of gap-widening prevention members may include a wire that connects first and second slit members that are disposed adjacent to each other.

The hinge unit may be slidably connected in the longitudinal direction of the flexible display to at least one of the first body and the second body.

A sliding groove that extends in the longitudinal direction may be formed in at least one of the first body and the second body, and the support member of the hinge unit may be configured to be supported by one pair of holders that are disposed on both sides in the longitudinal direction, and a sliding rail that is provided on at least one of the one pair of holders and that is inserted into the sliding groove and is configured to be slid.

The electronic device may further include a stopper provided on at least one of the one pair of holders, and a projecting ridge provided on at least one of the first and second bodies, and that is configured to prevent the hinge unit from being separated from the first and second bodies by catching the stopper.

The electronic device may further include a sliding plate that is coupled to the hinge unit, and a sliding frame that is coupled to at least one of the first and second bodies, and by which the sliding plate is slidably supported.

The electronic device may further include an unfolding angle adjustment unit that is configured to stop the sliding plate at one or more positions during sliding.

The unfolding angle adjustment unit may be configured to stop the sliding plate at a first position that corresponds to a state where the first and second bodies are completely unfolded, and at least one second position between the state where the first and second bodies are completely unfolded and a state where the first and second bodies are completely folded.

The unfolding angle adjustment unit may include an angle adjustment post that is provided on the sliding plate, and an angle adjustment slot that is provided in the sliding frame so that the angle adjustment post may be inserted into the angle adjustment slot to be slid, and includes first and second locking portions that have a slot width configured to lock the angle adjustment post at the first and second positions and concave portions that are disposed between the first and second locking portions and have a slot width less than the slot width of the first and second locking portions.

According to an aspect of another exemplary embodiment, there is provided an electronic device including a first body and a second body, a flexible display configured to be support by the first body and the second body, and a hinge unit configured to connect to the first body and the second body, and form a curved portion that is configured to prevent the flexible display from being overly bent in a folded state, wherein the hinge unit is slidably connected to at least one of the first and second bodies.

The electronic device may further include an unfolding angle adjustment unit configured to set an unfolding angle between the first body and the second body by locking the hinge unit at one or more positions during sliding.

The unfolding angle adjustment unit may be further configured to stop the hinge unit in a first state where the first body and the second body are completely unfolded, and in a second state between the first state and a state where the first body and the second body are completely folded.

The electronic device may further include a sliding plate coupled to the hinge unit, and a sliding frame coupled to at least one of the first body and the second body, and is configured to slidably support the sliding plate, wherein the unfolding angle adjustment unit includes an angle adjustment post disposed on the sliding plate, and an angle adjustment slot, formed in the sliding plate through which the angle adjustment post is inserted and is configured to be slid, including a first locking portion that has a slot width to lock the angle adjustment post in the first state, a second locking portion that have the slot width to lock the angle adjustment post in the second state, and concave portions that are disposed between the first locking portion and second locking portion and have a slot width less than the slot width of the first locking portion and the second locking portion.

The hinge unit may include a support member configured to be bendable and supported by the first body and the second body, and a plurality of slit members, wherein each slit member of the plurality of slit members includes a fixed end that is supported by the support member and a free end that extends from the fixed end toward the flexible display, and wherein the plurality of slit members are arranged in a longitudinal direction relative to the flexible display and are spaced apart by a predetermined interval.

The electronic device may further include a plurality of gap-widening prevention members configured to prevent an interval between the free ends of the plurality of slit members from being greater than an interval in an unfolded state.

Each of the plurality of gap-widening prevention members may include one pair of wing portions configured to restrict free ends of first and second slit members of the plurality of slit members that are disposed adjacent to each other from being moved farther away from each other, and a connection portion configured to connect the one pair of wing portions.

The plurality of gap-widening prevention members may be integrally formed with the plurality of slit members.

Each of the plurality of gap-widening prevention members may include a connection portion that extends from a first slit member to a second slit member that is disposed adjacent to the first slit member, and a wing portion that is disposed on an end portion of the connection portion and restricts the second slit member from being spaced apart from the first slit member, wherein a recess that is recessed inward from an outer surface of the second slit member and configured to receive the wing portion is formed in the outer surface of the second slit member.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
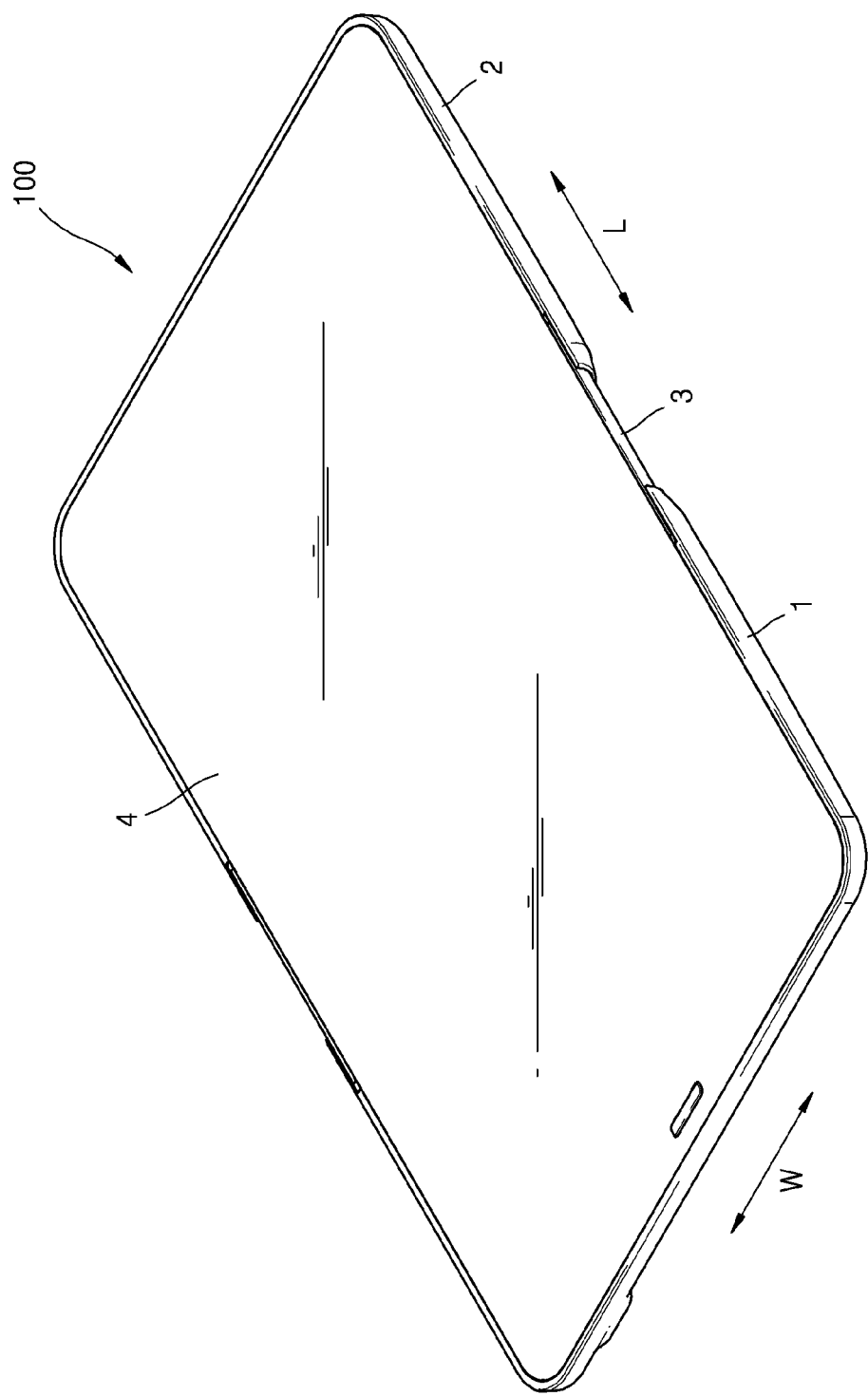
FIG. 1 is a perspective view illustrating an outer appearance of an electronic device that is foldable, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

The exemplary embodiments now will be described more fully hereinafter with reference to the accompanying drawings. In the drawings, like reference numerals denote like elements, and sizes or thicknesses of elements may be exaggerated for clarity.

Figure 2:
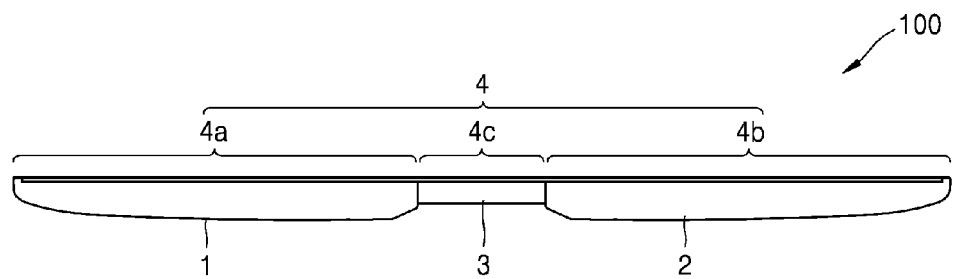
FIG. 2 is a side view illustrating an unfolded state of an electronic device, according to an exemplary embodiment.
Figure 3:
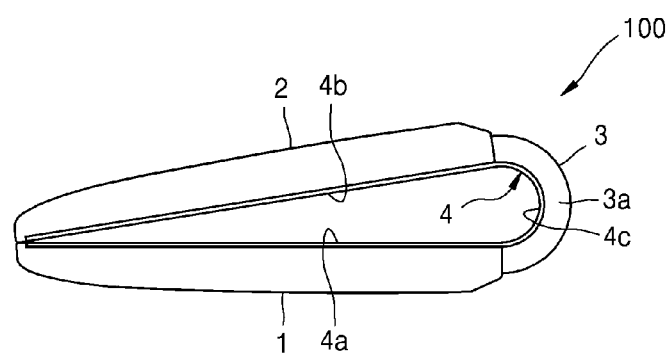
FIG. 3 is a side view illustrating a folded state of an electronic device, according to an exemplary embodiment.

FIG. 1 is a perspective view illustrating an outer appearance of an electronic device 100 that is foldable, according to an exemplary embodiment. FIG. 2 is a side view illustrating an unfolded state of the electronic device 100 of FIG. 2. FIG. 3 is a side view illustrating a folded state of the electronic device 100 according to an exemplary embodiment.

Referring to FIGS. 1, 2, and 3, the electronic device 100 includes first and second bodies 1 and 2, a flexible display element 4, and a hinge unit 3. The flexible display element 4 is supported by the first body 1 and the second body 2. For example, the flexible display element 4 may be adhered to the first body 1 and the second body 2 by using an adhesive member such as an adhesive or a double-sided tape. The hinge unit 3 is disposed between the first and second bodies 1 and 2, and foldably connects the first and second bodies 1 and 2.

The electronic device 100 may be a portable mobile device such as a communication terminal, a game console, a multimedia player, a portable computer, or an imaging device. The electronic device 100 may be any of other devices including the first body 1 that performs a main function and allows a first portion 4a of the flexible display element 4 to be coupled thereto and the second body 2 that allows a second portion 4b of the flexible display element 4 to be coupled thereto and is foldably connected to the first body 1 by using the hinge unit 3.

A processing unit and an input/output unit for performing a function according to the use of the electronic device 100 may be provided in or on the first and second bodies 1 and 2. For example, according to an exemplary embodiment, when the electronic device 100 is a multimedia player that may provide an image and an audio file, the processing unit may include an image/sound information processing unit. Alternatively, when the electronic device 100 is a communication terminal, the processing unit may include a communication module. The input/output unit may include an image/sound input/output unit and a manipulation unit for user manipulation. The manipulation unit may include a touch panel that is integrated into the flexible display element 4 and/or, a button, a microphone, and/or a camera that is integrated into either one of the first or second bodies.

The flexible display element 4 may be divided into the first portion 4a that is coupled to the first body 1, the second portion 4b that is coupled to the second body 2, and a third portion 4c that is disposed between the first body 1 and the second body 2. The third portion 4c of the flexible display element 4 may not be fixed to the hinge unit 3. As the third portion 4c of the flexible display element 4 is bent, the electronic device 100 may be folded as shown in FIG. 3. In a folded state in which the electronic device 100 is folded, the hinge unit 3 is disposed outside the flexible display element 4, to form a curved portion 3a having a predetermined curvature as shown in FIG. 3. In this folded state, because the hinge unit 3 cannot be bent any further, the third portion 4c of the flexible display element 4 may be protected from being bent sharply beyond the predetermined curvature.

Figure 4:
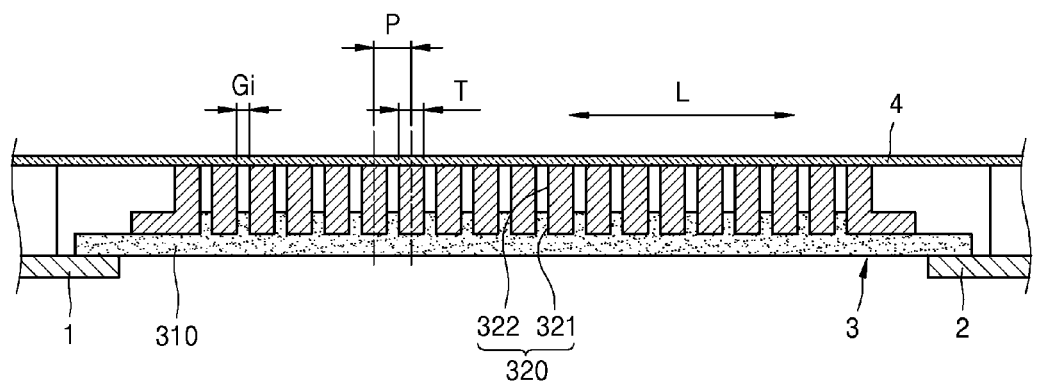
FIG. 4 is a cross-sectional view illustrating a hinge unit of an electronic device, according to an exemplary embodiment.

FIG. 4 is a cross-sectional view of a hinge unit 3, illustrating an unfolded state of an electronic device, according to an exemplary embodiment. Referring to FIG. 4, the hinge unit 3 includes a support member 310 that is soft, and a plurality of slit members 320 each including a fixed end 321 that is supported by the support member 310 and a free end 322 that extends from the fixed end 321. The support member 310 may be formed of an elastomer such as a rubber that may be freely bent and has flexibility. Each of the plurality of slit members 320 may have a rod shape that extends in a width direction W (see FIG. 1) of the flexible display element 4. According to another exemplary embodiment, the plurality of slit members 320 may each have a pillar shape with similar dimensions in the W direction as in the L direction. Alternatively, the plurality of slit members 320 may include slit members with different shapes in the W direction, for example, some may be rod shaped while others may be pillar shapes while others may have other shapes in the W direction.

Figure 5:
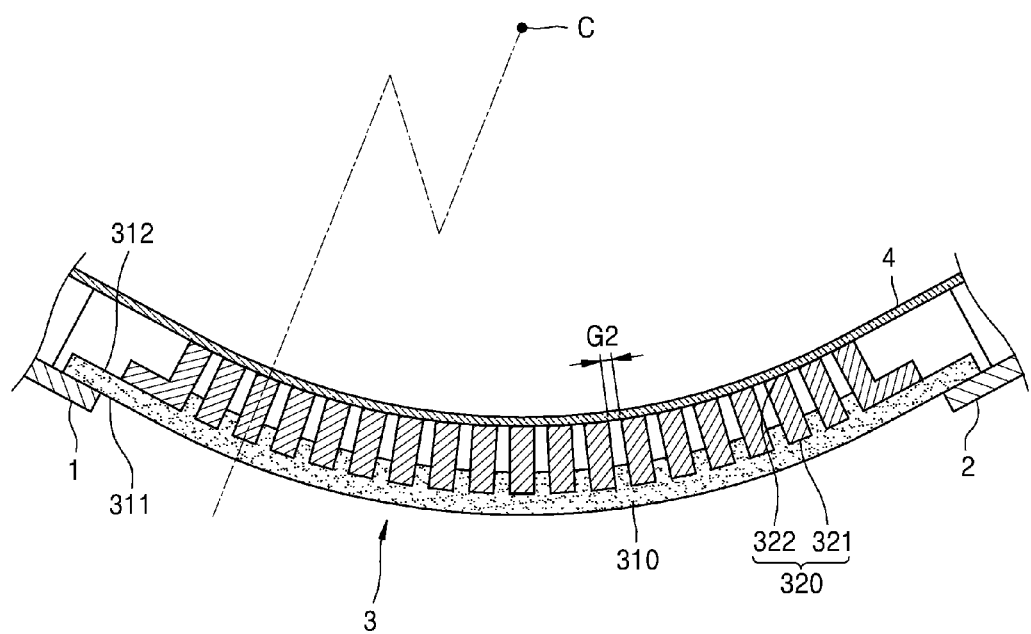
FIG. 5 is a cross-sectional view of a hinge unit, illustrating a partially folded state where an electronic device is folded at a predetermined angle, according to an exemplary embodiment.

A cross-sectional view along the L direction as shown in, for example, FIG. 4 or 5, of each of the slit members 320 may be, for example, a quadrangular shape. The plurality of slit members 320 are arranged in a longitudinal direction L (see FIG. 1) of the flexible display element 4 to be spaced apart from each other. When a pitch between the plurality of slit members 320 is P and a thickness of each of the slit members 320 is T, an initial interval Gi between two adjacent slit members 320 is P-T.

According to another exemplary embodiment, the plurality of slit members 320 may each have a trapezoidal shape, and more specifically an isosceles trapezoid shape, when viewed from a cross-sectional view along the L direction. Particularly, at the free end of the plurality of slit members the distance between each slit member may still be spaced apart by the interval Gi. However, at the fixed end of the plurality of slit members the distance may be reduced such that that the slits meet at a point. Further, the open space defined by the interval Gi portion when in an unfolded state will completely disappear by being filled with the plurality of slit members due to their trapezoidal shape which would indicate and coincide with an electronic device being in a completely folded state. Further, the shape of the plurality of slit members in cross section may be a number of other shapes such as a conical frustum, a hemisphere, an elliptical cone, a parabolic cone, or any combination thereof.

The slit member 320 is formed of a material that is harder than that of the support member 310. For example, the slit member 320 may be formed of plastic, metal, or ceramic. For example, the hinge unit 3 including the plurality of slit members 320 whose fixed ends 321 are supported by the support member 310 may be manufactured by arranging the plurality of slit members 320 in a mold at predetermined pitches P to make the slit members 320 spaced apart from each other and injecting an elastomer that is a material of the support member 310 into the mold. Both end portions of the support member 310 in the longitudinal direction L may be fixed to the first and second bodies 1 and 2. Also, both end portions of the support member 310 may be supported by holders and the holders may be fixed to the first and second bodies 1 and 2. According to another exemplary embodiment, the support member and plurality of slit members may be formed from the same flexible material.

In the unfolded state of FIG. 4, the support member 310 has a linear shape, and an interval between the free ends 322 of the plurality of slit members 320 and an interval between the fixed ends 321 of the plurality of slit members 320 are the same as the initial interval Gi.

FIG. 5 is a cross-sectional view of the hinge unit 3, illustrating a partially folded state where the electronic device 100 is folded at a predetermined angle, according to an exemplary embodiment. Referring to FIG. 5, the support member 310 has an arc shape having a curvature. A radius of curvature of an inner circumferential surface 312 of the support member 310 is less than a radius of curvature of an outer circumferential surface 311 of the support member 310. Because the support member 310 is a soft member, the plurality of slit members 320 are centered around a center C of the support member 310 having the arc shape, the free ends 322 of the plurality of slit members 320 are moved closer to each other, and thus an interval G2 is less than the initial interval Gi.

Figure 6:
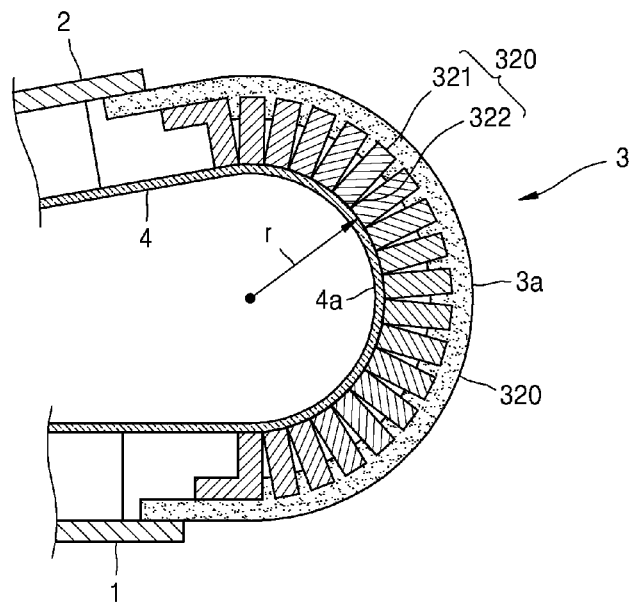
FIG. 6 is a cross-sectional view of a hinge unit, illustrating a completely folded state where an electronic device is completely folded, according to an exemplary embodiment.

FIG. 6 is a cross-sectional view of the hinge unit 3, illustrating a completely folded state where the electronic device 100 is completely folded, according to an exemplary embodiment.

Referring to FIG. 6, the free ends 322 of the plurality of slit members 320 contact each other, and thus the hinge unit 3 forms the curved portion 3a having a predetermined radius of curvature r. The radius of curvature r of the curved portion 3a that is formed by the hinge unit 3 is determined by the thickness T (see FIG. 4) of each of the plurality of slit members 320, the pitch P (see FIG. 4) between the slit members 320, and the number of the slit members 320. In this completely folded state, even when the hinge unit 3 tries to be further bent, because the free ends 322 of the plurality of slit members 320 that are each formed of a hard material contact each other, the hinge unit 3 will not bent any further. In this completely folded state, because the flexible display element 4 is disposed inside the hinge unit 3, the flexible display element 4 may be protected by the hinge unit 3 from being sharply bent.

Figure 7:
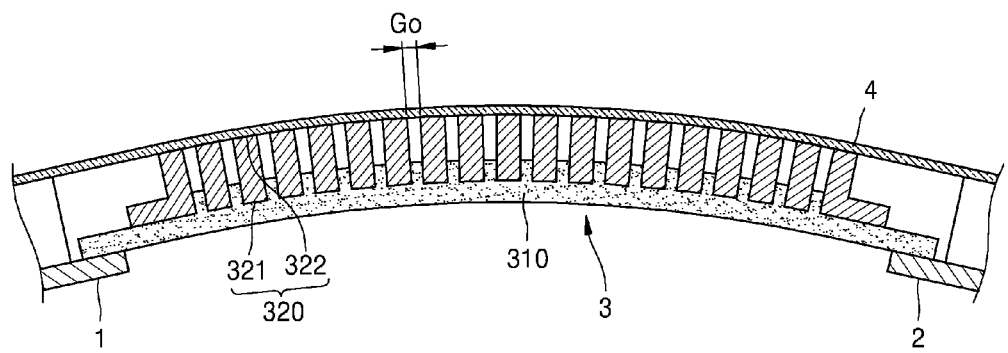
FIG. 7 is a cross-sectional view of a hinge unit when an electronic device is folded in a direction opposite to a folding direction according to an exemplary embodiment.

FIG. 7 is a cross-sectional view of the hinge unit 3 when the electronic device 100 is folded in a direction opposite to a folding direction. Referring to FIG. 7, because the support member 310 is a soft member, the hinge unit 3 may be bent in the direction opposite to the folding direction. When the electronic device 100 is folded such that the flexible display element 4 is disposed outside the hinge unit 3, because the flexible display element 4 is coupled to the first and second bodies 1 and 2 and thus a length of the flexible display element 4 is not increased, a tensile force may be applied to the flexible display element 4 and thus the flexible display element 4 may be separated from the first and second bodies 1 and 2 or the flexible display element 4 may be damaged. Referring to FIGS. 5 and 6, when the hinge unit 3 is bent in the folding direction, the free ends 322 of the plurality of slit members 321 are moved closer to each other. That is, an interval between the free ends 322 of the plurality of slit members 320 is less than the initial interval Gi. In contrast, when the hinge unit 3 is bent in the direction opposite to the folding direction as shown in FIG. 7, the free ends 322 of the plurality of slit members 320 are moved farther away from each other. That is, an interval Go between the free ends 322 of the plurality of slit members 320 is greater than the initial interval Gi. Hence, the hinge unit 3 may be prevented from being bent in the direction opposite to the folding direction by restricting the free ends 322 of the plurality of slit members 320 from being moved farther away from each other. For example, the hinge unit 3 may be prevented from being bent in the direction opposite to the folding direction by limiting an interval between the free ends 322 of the plurality of slit members 320 not to be greater than an interval in the unfolded state, that is, the initial interval Gi.

According to one exemplary embodiment, a second plurality of slit members, which may serve as gap-widening prevention members, may be provided in order to avoid bending in the opposite direction which would create an interval of Go between the free ends of the first plurality of slit members which could possibly damage or disconnected the flexible display element. Particularly, the second plurality of slit members may be provided such that their fixed ends are attached on a lower surface opposite the upper surface upon which the first plurality of slit members is attached. Further, the second plurality of slit members free ends extend downward in the opposite direction as the first plurality of slit members. The interval between each slit member of the second plurality of slit members may be set such that the opposite bending is either avoided entirely, by making the interval near zero, or restricted to an acceptable bending shape by adjusting the interval and shape of the second plurality of slit members similar to the adjustment made to the first plurality of slit members.

Figure 8:
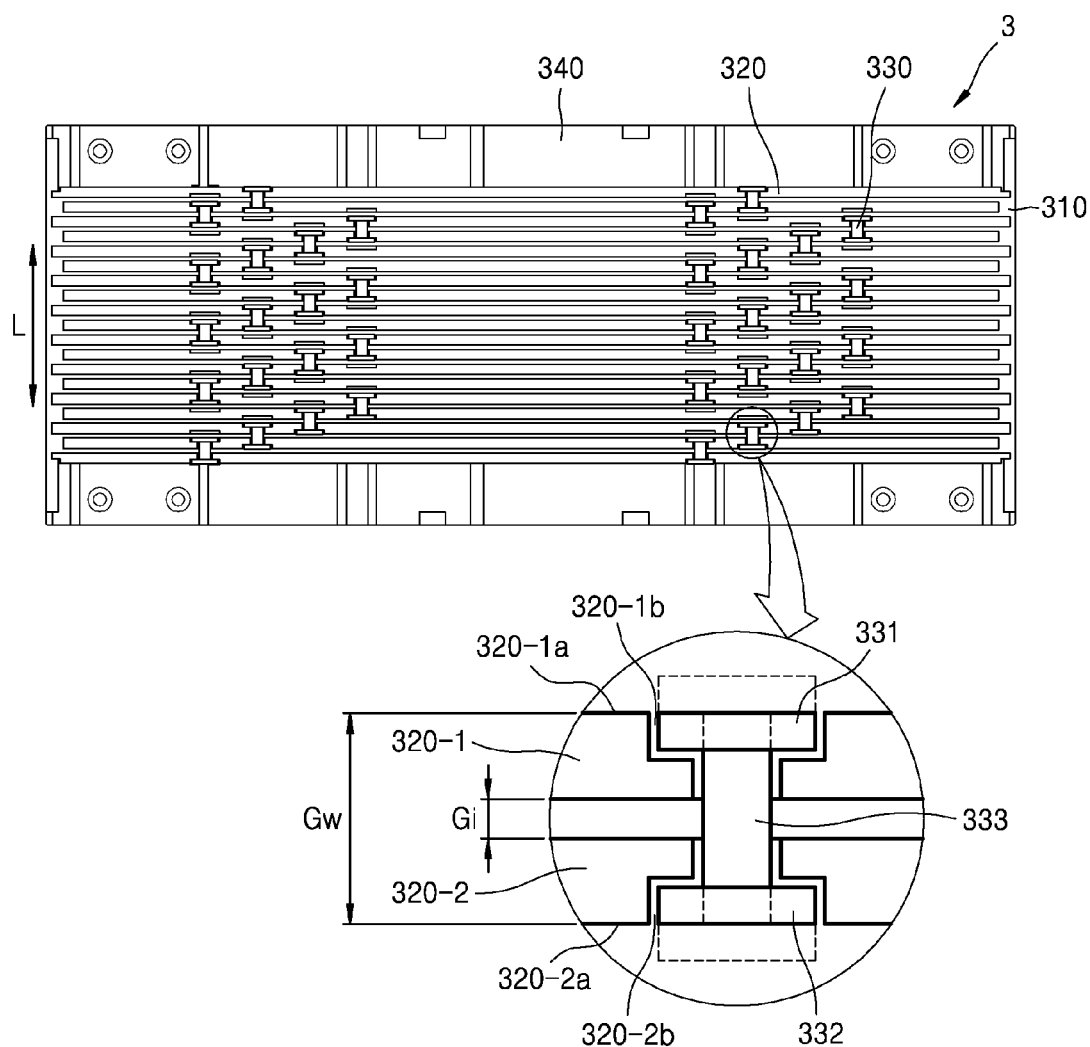
FIG. 8 is a plan view illustrating a hinge unit that may limit a bending direction, according to an exemplary embodiment.

According to another exemplary embodiment, FIG. 8 is a plan view illustrating the hinge unit 3 that may limit a bending direction, according to an exemplary embodiment. Referring to FIG. 8, the hinge unit 3 further includes gap-widening prevention members 330 that prevent the free ends 322 of the plurality of slit members 320 from moving farther away from each other that the interval provided in an unfolded state. The plurality of gap-widening prevention members 330 may be arranged in a zigzag fashion to connect adjacent slit members 320. According to another exemplary embodiment, the gap-widening prevention members 330 may be, for example, clip members that each surround outer surfaces of two adjacent slit members 320-1 and 320-2. Holders 340 are disposed on both end portions of the support member 310 in the longitudinal direction L, support the support member 310, and are coupled to the first and second bodies 1 and 2.

Figure 9:
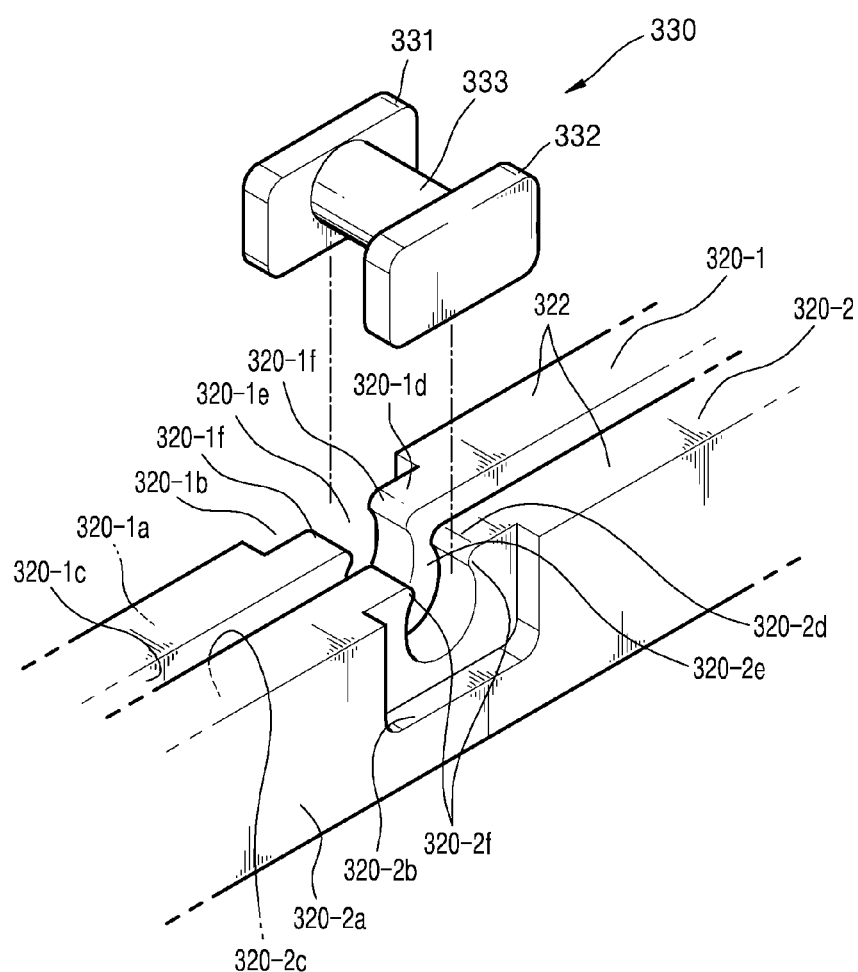
FIG. 9 is an exploded perspective view illustrating an example where each of gap-widening prevention members and two slit members that are disposed adjacent to each other are coupled to each other according to an exemplary embodiment.

FIG. 9 is an exploded perspective view illustrating an example where each of the gap-widening prevention members 330 and the slit members 320-1 and 320-2 are coupled to each other. Referring to FIGS. 8 and 9, the gap-widening prevention member 330 includes wing portions 331 and 332 that prevent the free ends 322 of the slit members 320-1 and 320-2 from being moved farther away from each other, and a connection portion 333 that connects the wing portions 331 and 332. Recesses 320-1*b* and 320-2*b* that are recessed inward from outer surfaces 320-1*a* and 320-2*a* are respectively formed in the slit members 320-1 and 320-2, and the wing portions 331 and 332 are respectively inserted into the recesses 320-1*b* and 320-2*b*. The recesses 320-1*b* and 320-2*b* are recessed downward from the free ends 322 of the slit members 320-1 and 320-2. An outer interval Gw of the wing portions 331 and 332 may be equal to or less than a sum of the initial interval Gi and thicknesses of the slit members 320-1 and 320-2. In this configuration, the initial interval Gi is not affected by thicknesses of the wing portions 331 and 332. However, the present exemplary embodiment is not limited thereto, and the wing portions 331 and 332 may be supported by outer surfaces 320-1*a* and 320-2*a* of the slit members 320-1 and 320-2 as marked by dashed lines of FIG. 8, and the wing portions 331 and 332 may be disposed in the initial interval Gi between the slit members 320. In this case, the initial interval Gi, the pitch P between the slit members 320, and the number of the slit members 320 may be appropriately determined in consideration of the radius of curvature r in the folded state.

Figure 10:
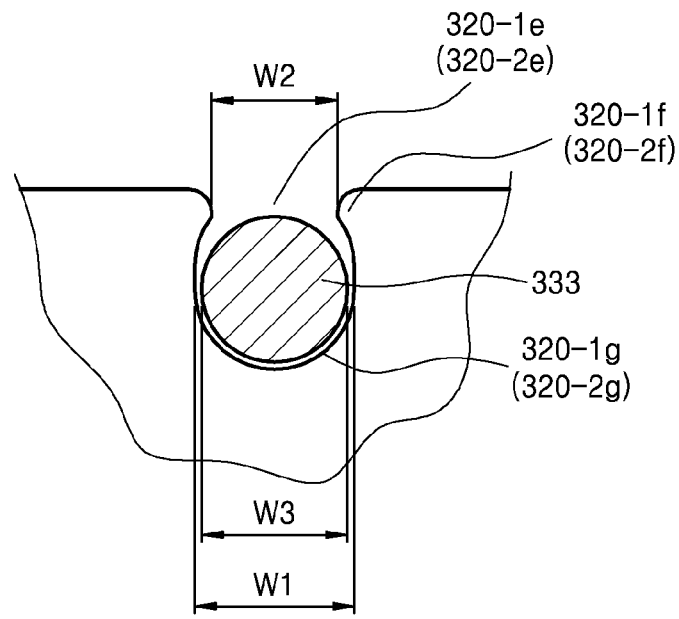
FIG. 10 is a side view illustrating a separation prevention unit according to an exemplary embodiment.

A coupling unit to which the gap-widening prevention member 330 is coupled is provided in the slit members 320-1 and 320-2. The coupling unit may include slots 320-1*e* and 320-2*e* that are formed in barrier walls 320-1*d* and 320-2*d* between the recesses 320-1*b* and 320-2*b* and inner surfaces 320-1*c* and 320-2*c* of the slit members 320-1 and 320-2. The connection portion 333 may be inserted into the slots 320-1*e* and 320-2*e*. A separation prevention unit may be provided in the slots 320-1*e* and 320-2*e* to prevent the connection portion 333 that is inserted into the slots 320-1*e* and 320-2*e* from being separated from the slots 320-1*e* and 320-2*e*. FIG. 10 is a side view illustrating the separation prevention unit according to an exemplary embodiment.

Further, referring to FIGS. 9 and 10, the separation prevention unit may include, for example, protrusions 320-1*f* and 320-2*f* that protrude inward from both side walls of the slots 320-1*e* and 320-2*e*. A width W1 of each of the slots 320-1*e* and 320-2*e* is greater than a width W3 of the connection portion 333, and an interval W2 between each of the protrusions 320-1*f* and 320-2*f* is less than the width W3 of the connection portion 333. The interval W2 between each of the protrusions 320-1*f* and 320-2*f* is set so as to allow the connection portion 333 to pass therethrough when a predetermined force is applied downward to the connection portion 333 that is placed over the slots 320-1*e* and 320-2*e*. For example, when the slit members 320-1 and 320-2 are formed of a material that is softer than that of the gap-widening prevention member 330, the interval W2 between each of the protrusions 320-1*f* and 320-2*f* may be slightly increased due to a force for pressing downward the connection portion 333 and thus the connection portion 333 may pass through the protrusions 320-1*f* and 320-2*f*.

Figure 11:
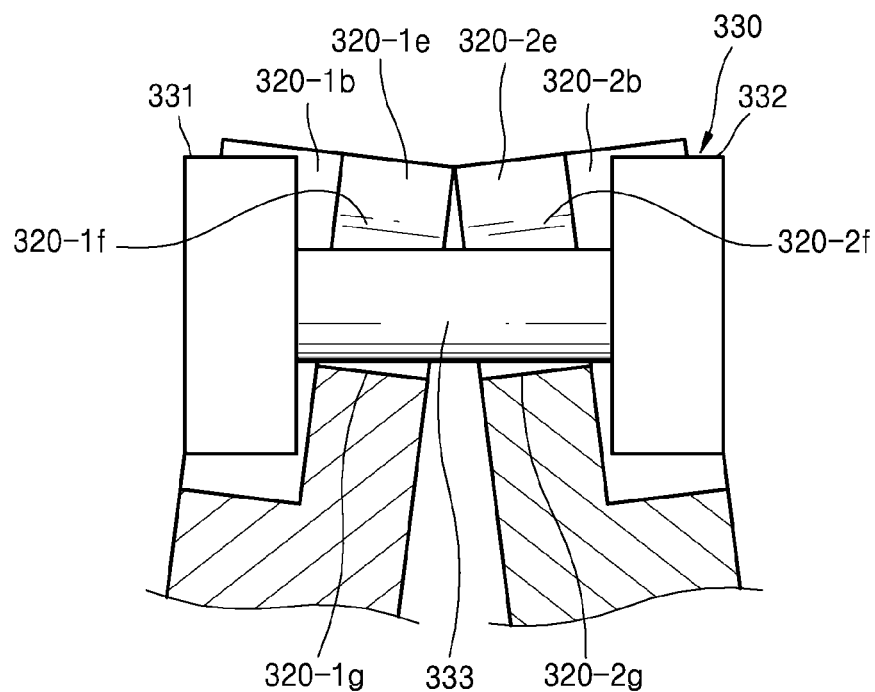
FIG. 11 is a cross-sectional view illustrating a state where a hinge unit, similar to the hinge unit of FIGS. 8 through 10, is bent in a folding direction and free ends of two slit members that are disposed adjacent to each other are moved closer to each other according to an exemplary embodiment.

FIG. 11 is a cross-sectional view illustrating a state where the hinge unit 3 is bent in the folding direction, and the free ends 322 of the slit members 320-1 and 320-2 are moved closer to each other. Referring to FIG. 11, the free ends 322 of the slit members 320-1 and 320-2 may be freely inclined in order to be moved closer to each other. To this end, a gap may be formed between the connection portion 333 and the slots 320-1*e* and 320-2*e*. Because the width W1 of each of the slots 320-1*e* and 320-2*e* is greater than the width W3 of the connection portion 333, the connection portion 333 may be moved in a width direction of each of the slots 320-1*e* and 320-2*e* in each of the slots 320-1*e* and 320-2*e*. Also, a depth from each of the protrusions 320-1*f* and 320-2*f* to each of bottoms 320-1*g* and 320-2*g* of the slots 320-1*e* and 320-2*e* is determined such that after passing through the protrusions 320-1*f* and 320-2*f*, the connection portion 333 may be moved vertically (in an insertion direction) between the protrusions 320-1*f* and 320-2*f* and the bottoms 320-1*g* and 320-2*g*. Accordingly, when the hinge unit 3 is bent in the folding direction, the free ends 322 of the slit members 320-1 and 320-2 may be naturally inclined to be moved closer to each other.

Although two protrusions 320-1*f* and 320-2*f* are formed in each of the slots 320-1*e* and 320-2*e* in FIGS. 9 and 10, the present exemplary embodiment is not limited thereto. For example, one protrusion 320-1*f* or 320-2*f* that protrudes inward from one side wall of the slot 320-1*e* or 320-2*e* may be formed. In this case, the interval W2 is an interval between the protrusion 320-1f or 320-2f and an internal surface of the slot 320-1e or 320-2e that faces the protrusion 320-1f or 320-2f.

Figure 12:
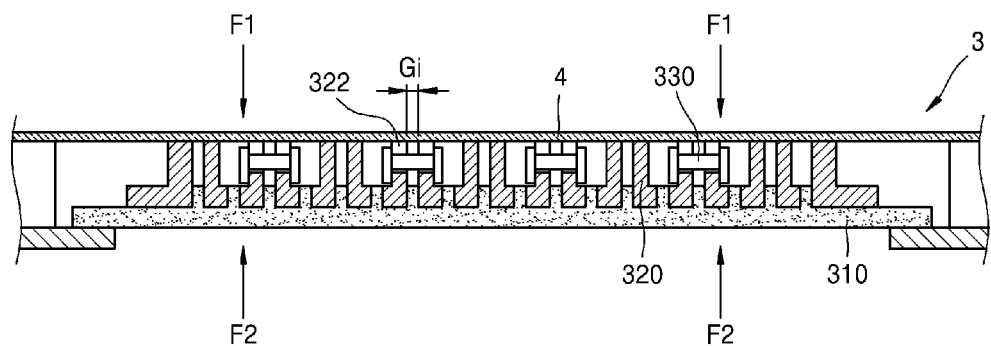
FIG. 12 is a cross-sectional view illustrating an unfolded state of a hinge unit that may limit the bending direction, according to an exemplary embodiment.
Figure 13:
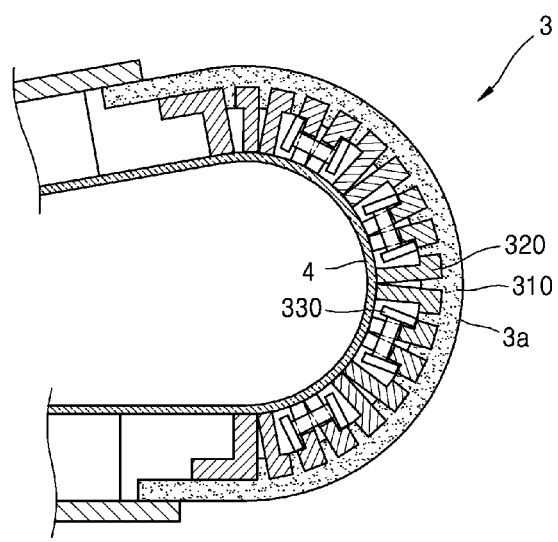
FIG. 13 is a cross-sectional view illustrating a folded state of a hinge unit that may limit the bending direction, according to an exemplary embodiment.

FIG. 12 is a cross-sectional view illustrating an unfolded state of the hinge unit 3 that may limit the bending direction of FIGS. 8 through 11, according to an exemplary embodiment. FIG. 13 is a cross-sectional view illustrating a folded state of the hinge unit 3 that may limit the bending direction of FIGS. 8 through 11, according to an exemplary embodiment. Referring to FIG. 12, in the unfolded state of the hinge unit 3, the initial interval Gi between the slit members 320 is maintained. In this state, even when a force F1 is applied to the hinge unit 3 to move the free ends 322 of the slit members 320 farther away from each other, because the free ends 322 of the slit members 320 are restricted from being moved away from each other due to the gap-widening prevention members 330, the hinge unit 3 is not bent. Accordingly, a tensile force may be prevented from being applied to the flexible display element 4, and thus the flexible display element 4 may be prevented from being damaged or the flexible display element 4 and the first and second bodies 1 and 2 may be prevented from being decoupled from each other.

When the free ends 322 of the slit members 320 are moved closer to each other, the free ends 322 of the slit members 320 are not restricted by the gap-widening prevention members 330. Hence, when a force F2 that is the opposite to a force F1 is applied to the hinge unit 3, the free ends 322 of the slit members 320 may be moved closer to each other, and the hinge unit 3 may be bent, to form the curved portion 3a having a predetermined curvature as shown in FIG. 13.

Figure 14:
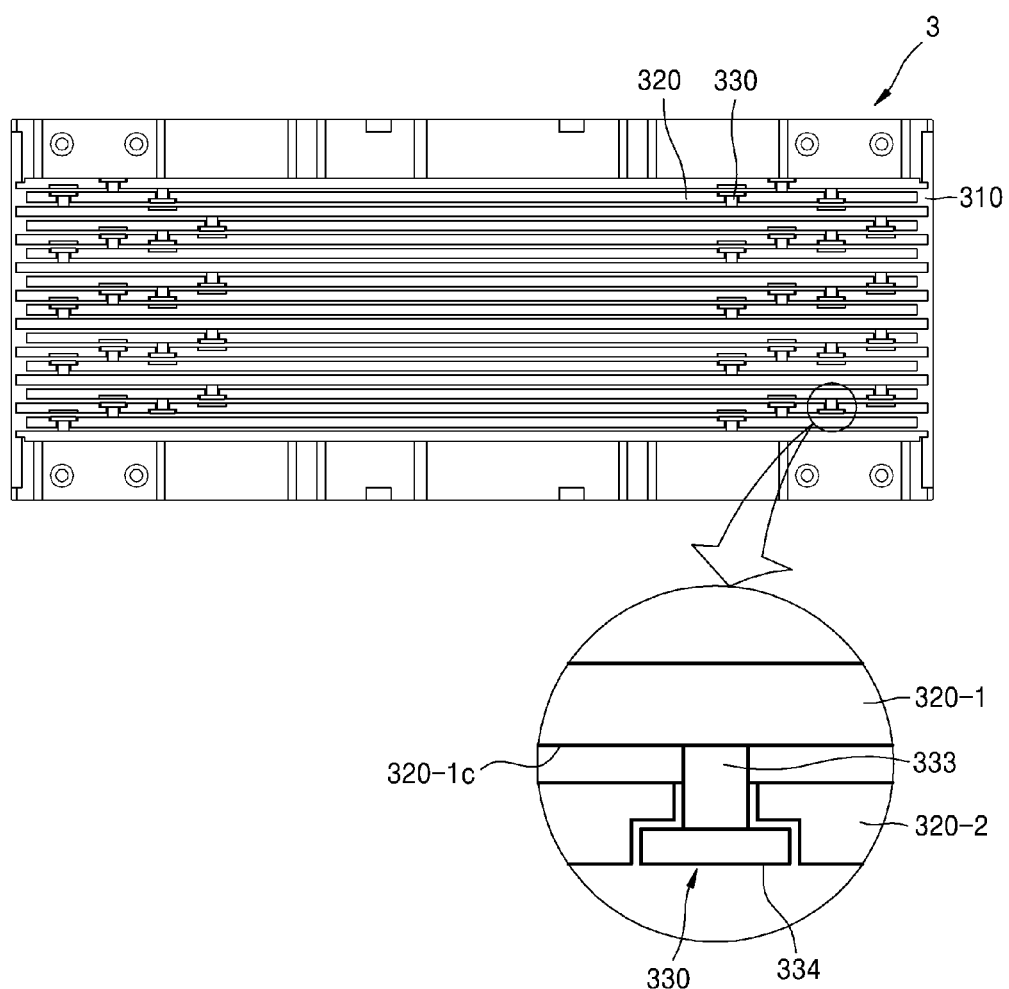
FIG. 14 is a plan view illustrating a hinge unit that may limit a bending direction, according to another exemplary embodiment.
Figure 15:
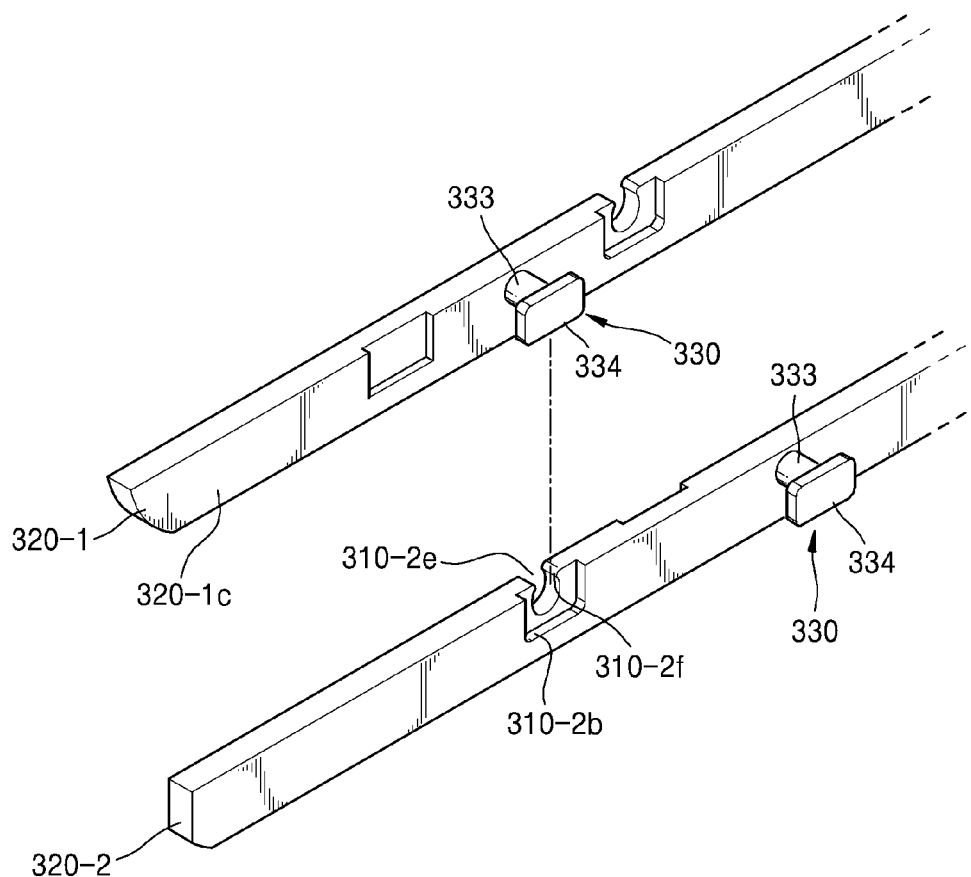
FIG. 15 is an exploded perspective view illustrating a hinge unit, similar to the hinge unit of FIG. 14, according to an exemplary embodiment.

FIG. 14 is a plan view illustrating the hinge unit 3 that may limit the bending direction, according to another exemplary embodiment. FIG. 15 is an exploded perspective view illustrating the hinge unit 3 of FIG. 14, according to an exemplary embodiment. In FIGS. 14 and 15, the gap-widening prevention members 330 are integrally formed with the slit members 320. Referring to FIGS. 14 and 15, a wing portion 334 is disposed on an end portion of the connection portion 333 that extends toward the slit member 320-2 from the inner surface 320-1c of the slit member 320-1. The recess 320-2b in which the wing portion 334 is received, the slot 320-2e into which the connection portion 333 is inserted, and the protrusion 320-2f that prevents the connection portion 333 from being separated from the slot 320-2e are provided in the slit member 320-2 that is disposed adjacent to the slit member 320-1. The connection portion 333, the recess 320-1b, the slot 320-1e, and the protrusion 320-1f that prevents the connection portion from being separated from the slot 320-1e are provided in a slit member that is disposed adjacent to the slit member 320-1 to be opposite to the slit member 320-2. Also, the connection portion 333 and the wing portion 332 that are coupled to another adjacent slit member are provided in the slit member 320-2.

In this configuration, the bending direction of the hinge unit 3 may be limited in the same manner as that described with reference to FIGS. 8 through 13. Also, because the gap-widening prevention members 330 are integrally formed with the slit members 320, the number of parts may be reduced, material costs may be reduced, the number of assembly processes may be reduced, and thus manufacturing costs may be reduced.

Figure 16:
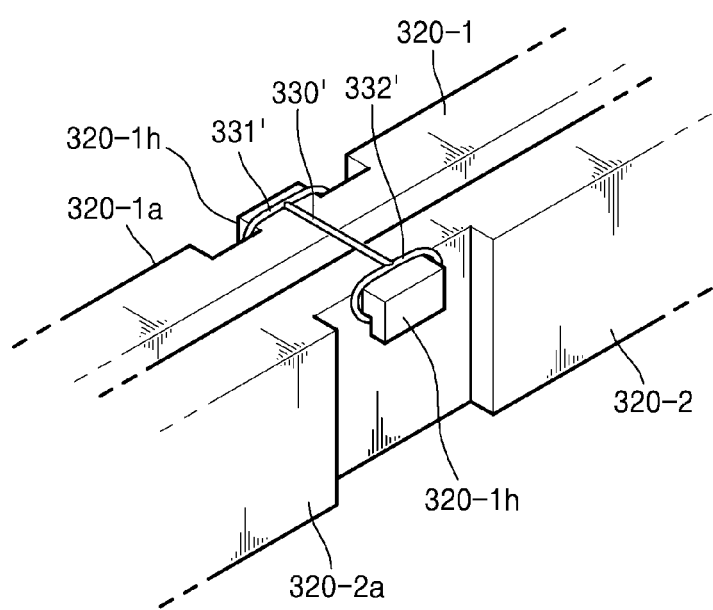
FIG. 16 is a perspective view illustrating a hinge unit that may limit a bending direction, according to another exemplary embodiment.

The gap-widening prevention members 330 are not limited to FIGS. 8 through 15. For example, the gap-widening prevention members 330 may include wires. FIG. 16 is a perspective view illustrating the hinge unit 3 that may limit the bending direction, according to another exemplary embodiment. Referring to FIG. 16, projections 320-1h and 320-2h are disposed on the outer surfaces 320-1a and 320-2a of the slit members 320-1 and 320-2. The projections 320-1h and 320-2h may extend downward after being bent in a "¬" shape from the free ends 322 of the slit members 320-1 and 320-2. The projections 320-1h and 320-2h are connected to each other by using a wire 330'. The wire 330' includes two looping portions 331' and 332' and a connection wire 333' that connects the looping portions 331' and 332'. When the looping portions 331' and 332' that are disposed on both sides of the wire 330' are caught by the projections 320-1h and 320-2h, the free ends 332 of the slit members 320-1 and 320-2 may be restricted from being moved farther away from each other. Alternatively, the gap-widening prevention members may be implemented by using a second plurality of slit members as described above.

Referring to FIGS. 2 and 3, the flexible display element 4 has no flexibility in length, a total length in the unfolded state of FIG. 2 and a total length in the folded state of FIG. 3 have to be substantially the same. However, because the first and second bodies 1 and 2 and the hinge unit 3 are disposed outside the flexible display element 4 in the folded state, a sum of lengths of outer walls of the hinge unit 3 and the first and second bodies 1 and 2 in the folded state has to be greater than a sum of lengths in the unfolded state. Because the first body 1 and the second body 2 are not flexible in general, a difference between the lengths of the outer walls in the unfolded state and the folded state may be compensated for by allowing the support member 310 of the hinge unit 3 to be formed of a flexible material having elasticity.

Figure 17:
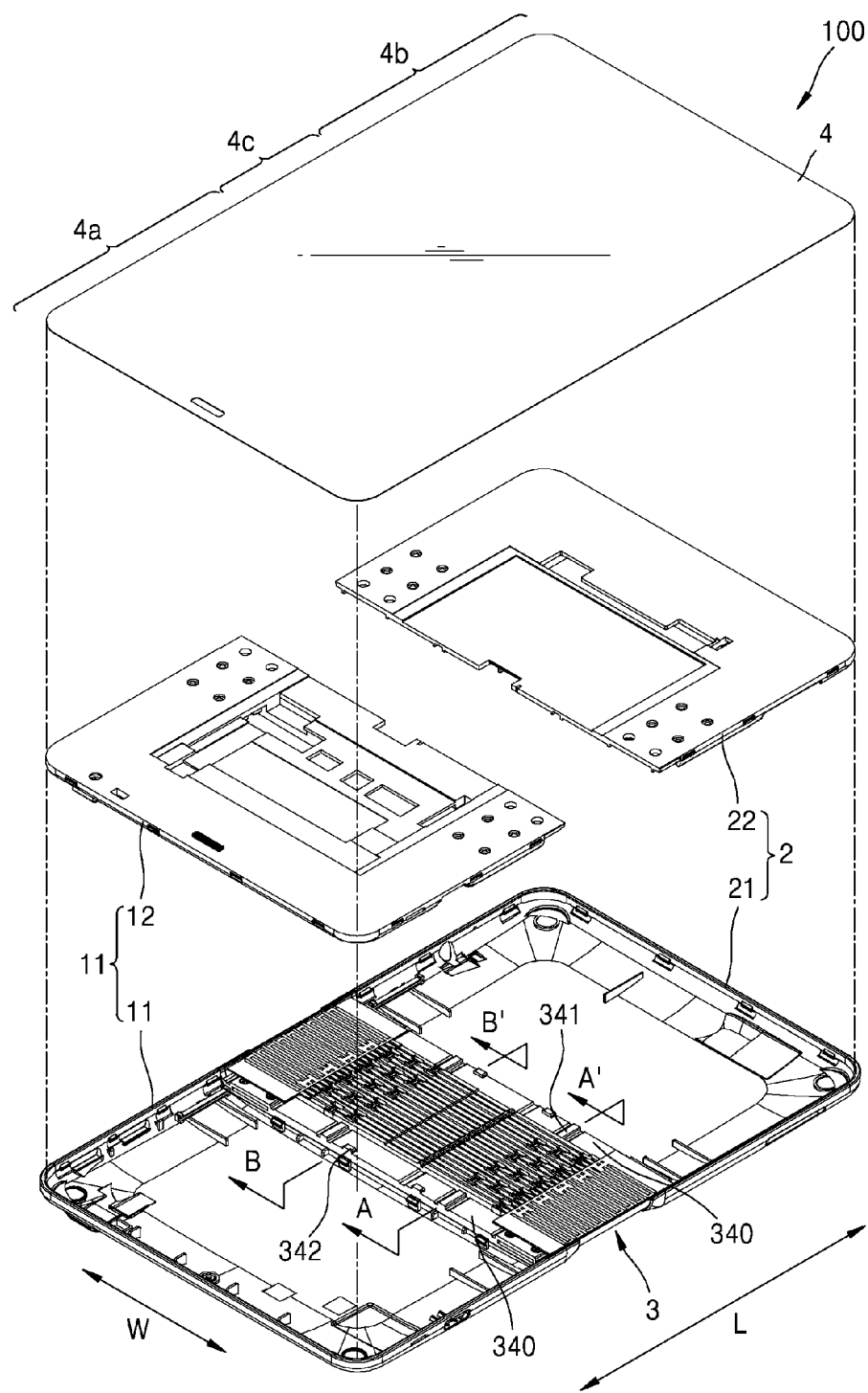
FIG. 17 is an exploded perspective view illustrating an electronic device in which a hinge unit and first and second bodies are slidably connected to each other, according to an exemplary embodiment.
Figure 18:
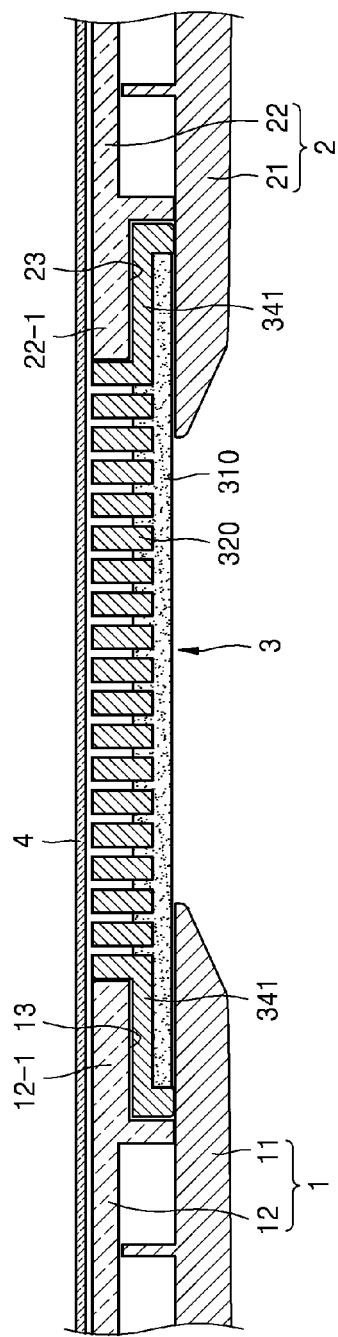
FIG. 18 is a cross-sectional view taken along a line A-A' of FIG. 17 according to an exemplary embodiment.
Figure 19:
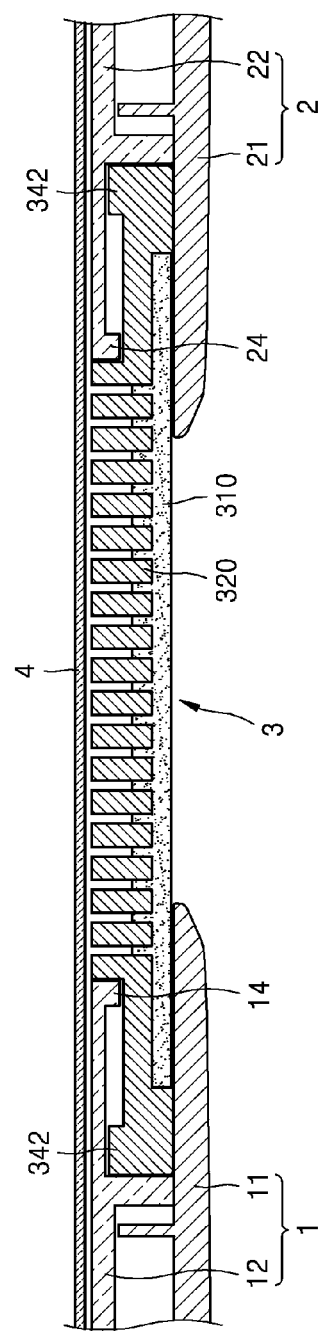
FIG. 19 is a cross-sectional view taken along a line B-B' of FIG. 17 according to an exemplary embodiment.

Alternatively, the difference between the lengths of the outer walls in the unfolded state and the folded state may be compensated for by allowing the hinge unit 3 and at least one of the first and second bodies 1 and 2 to be slid in the longitudinal direction L of the flexible display element 4. FIG. 17 is an exploded perspective view illustrating the electronic device 100 in which the hinge unit 3 and the first and second bodies 1 and 2 are slidably connected to each other, according to an exemplary embodiment. FIG. 18 is a cross-sectional view taken along a line A-A' of FIG. 17. FIG. 19 is a cross-sectional view taken along a line B-B' of FIG. 17.

Referring to FIG. 17, the first body 1 includes a first housing 11 that forms a portion of an outer appearance, and a first support plate 12 that is disposed on the first housing 11 and allows the first portion 4a of the flexible display element 4 to be coupled thereto. The second body 2 includes a second housing 21 that forms another portion of the outer appearance, and a second support plate 22 that is disposed on the second housing 21 and allows the second portion 4b of the flexible display element 4 to be coupled thereto. The hinge unit 3 is slidably coupled to each of the first and second housings 11 and 21. The hinge unit 3 may include the support member 310 and the slit members 320, or may include the support member 310, the slit members 320, and the gap-widening prevention members 330.

Referring to FIGS. 17 and 18, the support member 310 is supported by one pair of holders 340 that are disposed on both sides in the longitudinal direction L. Guide rails 341 that extend in the longitudinal direction L are disposed on the one pair of holders 340. Sliding grooves 13 and 23 into which the guide rails 341 are slidably inserted are formed in the first and second bodies 1 and 2. For example, portions 12-1 and 22-1 of the first and second support plates 12 and 22 may be spaced apart from inner surfaces of the first and second housings 11 and 21, and the sliding grooves 13 and 23 may be formed between the inner surfaces of the first and second housings 11 and 21 and the portions 12-1 and 22-1 of the first and second support plates 12 and 22.

Restriction units that restrict a sliding distance between the hinge unit 3 and the first and second bodies 1 and 2 may be further provided in order to prevent the first and second bodies 1 and 2 from being separated in the longitudinal direction L from the hinge unit 3. Referring to FIGS. 17 and 19, the restriction units may include, for example, stoppers 342 that are provided on the one pair of holders 340 and projecting ridges 14 and 24 that are disposed on the first and second bodies 1 and 2 and catch the stoppers 342. The stoppers 342 may protrude upward from edges of the holders 340. The projecting ridges 14 and 24 may protrude downward from the first and second support plates 12 and 22.

In this configuration, when the hinge unit 3 is folded, because the first and second bodies 1 and 2 are guided through the guide rails 341 and the sliding grooves 13 and 23 and are slid in the longitudinal direction L, lengths of outer walls may be increased. Hence, the electronic device 100 may be folded using a small force as shown in FIG. 3. Also, when the hinge unit 3 is completely folded, because the stoppers 342 are caught by the projecting ridges 14 and 24, the first and second bodies 1 and 2 and the hinge unit 3 may be prevented from being separated from each other.

A structure in which the first and second bodies 1 and 2 and the hinge unit 3 are slidably connected to each other has been described. However, the present exemplary embodiment is not limited thereto, and the hinge unit 3 and any one of the first and second bodies 1 and 2 may be slidably connected to each other. However, when the first and second bodies 1 and 2 and the hinge unit 3 are slidably connected to each other, because lengths of outer walls of the hinge unit 3 and the first and second bodies 1 and 2 are more naturally increased, the electronic device 100 may be more naturally folded as shown in FIG. 3.

Figure 20:
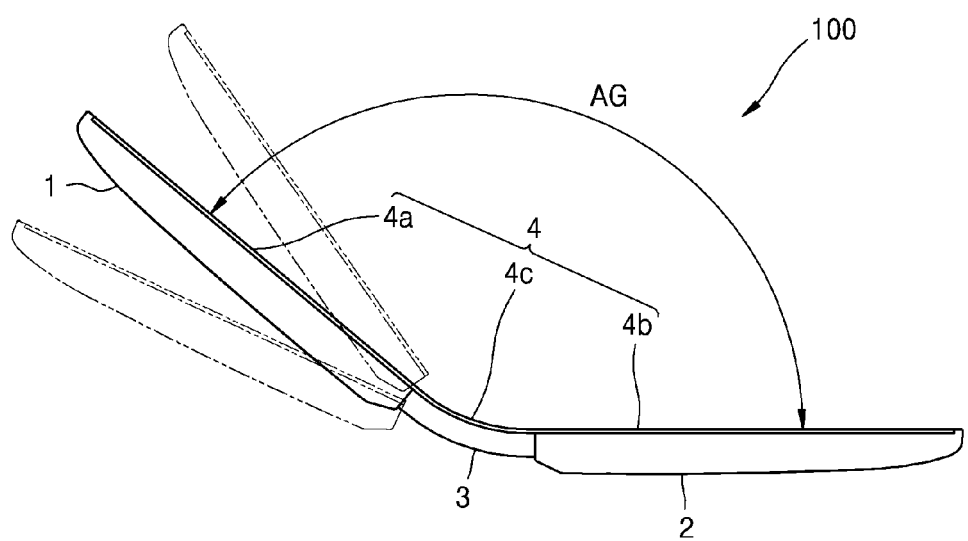
FIG. 20 is a side view illustrating an unfolding angle of an electronic device according to an exemplary embodiment.

The electronic device 100 may be stopped at a predetermined position between the unfolded state (see FIG. 2) and the completely folded state (see FIG. 3) as shown in FIG. 20. That is, an unfolding angle AG between the first and second bodies 1 and 2 may be adjusted by slidably connecting the first and second bodies 1 and 2 and the hinge unit 3 and enabling the electronic device 100 to be temporarily stopped at a predetermined position during the sliding. The number of the predetermined position(s) at which the electronic device 100 is stopped may be one, or two or more. In this configuration, usability may be improved by using a user interface (UI) and a screen suitable for the unfolding angle AG. For example, the first portion 4a that is supported by the first body 1 that is erected in the flexible display element 4 may be driven as an image display unit that displays an image, and the second portion 4b that is supported by the second body 2 that is laid down in the flexible display element 4 may be driven as an input unit that allows a key input.

Figure 21:
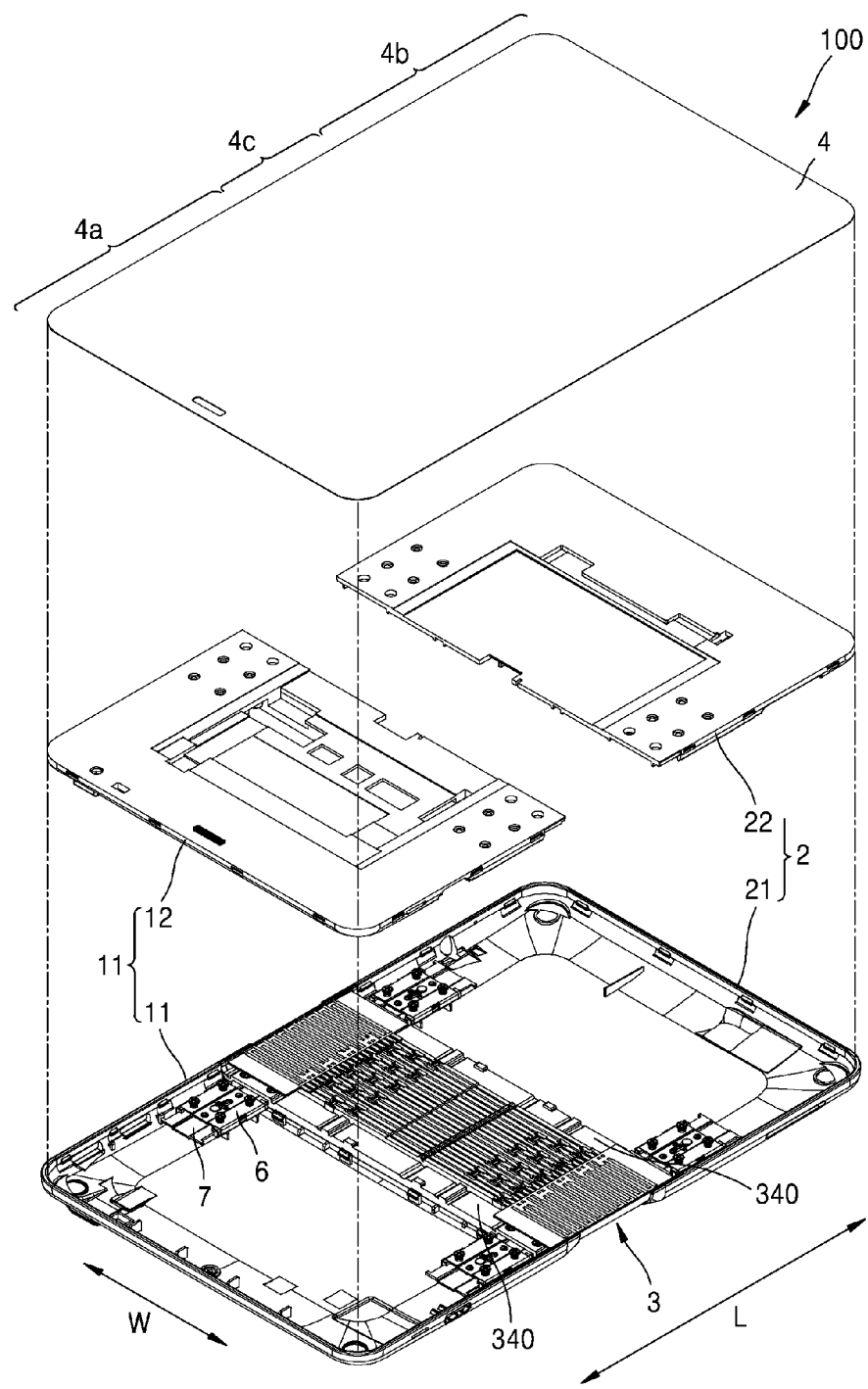
FIG. 21 is an exploded perspective view illustrating an electronic device in which the first and second bodies and a hinge unit are slidably connected to each other and the unfolding angle of the first and second bodies may be adjusted, according to another exemplary embodiment.
Figure 22:
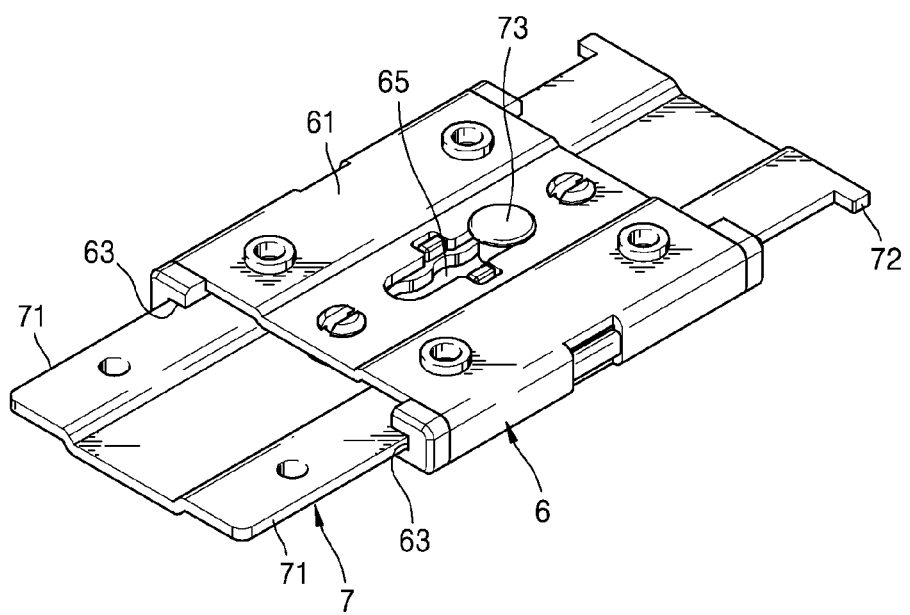
FIG. 22 is a perspective view illustrating a sliding frame and a sliding plate, according to an exemplary embodiment.
Figure 23:
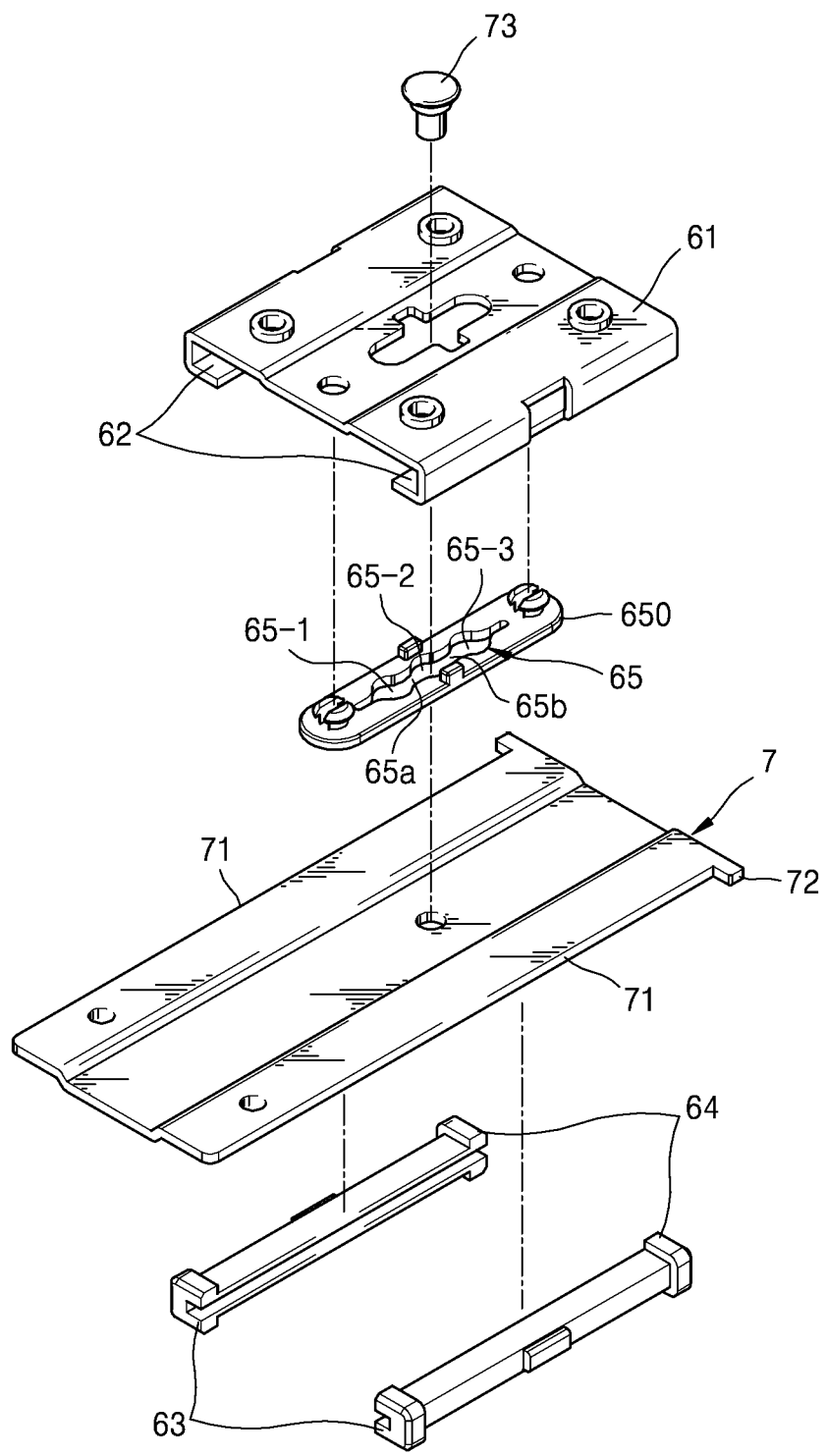
FIG. 23 is an exploded perspective view illustrating a sliding frame and a sliding plate, according to an exemplary embodiment.

FIG. 21 is an exploded perspective view illustrating the electronic device 100 in which the first and second bodies 1 and 2 and the hinge unit 3 are slidably connected to each other and the unfolding angle AG of the first and second bodies 1 and 2 may be adjusted, according to another exemplary embodiment. FIGS. 22 and 23 are respectively a perspective view and an exploded perspective view illustrating a sliding frame 6 and a sliding plate 7, according to an exemplary embodiment. Referring to FIGS. 21, 22, and 23, the sliding frame 6, and the sliding plate 7 that is slidably coupled to the sliding frame 6 are illustrated. The sliding frame 6 is coupled to the first and second bodies 1 and 2. For example, the sliding frame 6 may be coupled to each of the first and second support plates 12 and 22. The sliding plate 7 is coupled to the hinge unit 3. For example, the support member 310 may be supported by the one pair of holders 340 that are disposed on both sides in the longitudinal direction L, and the sliding plate 7 may be coupled to each of the holders 340.

Guide rails 71 that extend in the longitudinal direction L are provided on both side portions of the sliding plate 7. Guide grooves 63 into which the guide rails 71 are slidably inserted are formed in the sliding frame 6. For example, the sliding frame 6 may include a first member 61 that has "[" shape portions 62 formed on both side portions of the first member 61, and second members 64 that are disposed on the "[" shape portions 62 and include the guide grooves 63. The second members 64 may be formed of a material having lubricating properties that may reduce contact resistance with the guide rails 71. Examples of the material having lubricating properties may include an engineering plastic such as polyacetal, an oil-containing plastic, and a sintered metal. When the sliding plate 7 is slid relative to the sliding frame 6, the first and second bodies 1 and 2 and the hinge unit 3 may be slidably coupled to each other.

Restriction units that restrict a sliding distance between the first and second bodies 1 and 2 and the hinge unit 3 are provided in order to prevent the first and second bodies 1 and 2 from being separated in the longitudinal direction L from the hinge unit 3. For example, the restriction units may include stoppers 72 that are disposed on one end portion in a sliding direction of the sliding plate 7 (that is, the end portion opposite to a portion of the sliding plate 7 that is connected to the hinge unit 3) and are caught by an end portion of the sliding frame 6 in the longitudinal direction L. The stoppers 72 may protrude outward from, for example, an edge of the sliding plate 7 in a width direction (perpendicular to the sliding direction).

The unfolding angle AG between the first and second bodies 1 and 2 may be adjusted as shown in FIG. 20 by enabling the sliding plate 7 to be stopped at a predetermined position while being slid relative to the sliding frame 6. An unfolding angle adjustment unit that adjusts the unfolding angle AG between the first and second bodies 1 and 2 may include an angle adjustment slot 65 that is cut in the sliding direction, that is, the longitudinal direction L, of the flexible display element 4 and is formed in the sliding frame 6, and an angle adjustment post 73 that is disposed on the sliding plate 7 and is inserted into the angle adjustment slot 65. The angle adjustment slot 65 includes a plurality of locking portions 65-1, 65-2, and 65-3 that lock the angle adjustment post 73, and concave portions 65a and 65b that are disposed between the plurality of locking portions 65-1, 65-2, and 65-3 and have a slot width less than that of the plurality of locking portions 65-1, 65-2, and 65-3. For example, the angle adjustment slot 65 may be formed of a material having elasticity, and may be disposed on an elastic member 650 that is coupled to the sliding frame 6. Examples of the material having elasticity may include an engineering plastic such as polyacetal and an elastic metal such as a leaf spring.

Figure 24:
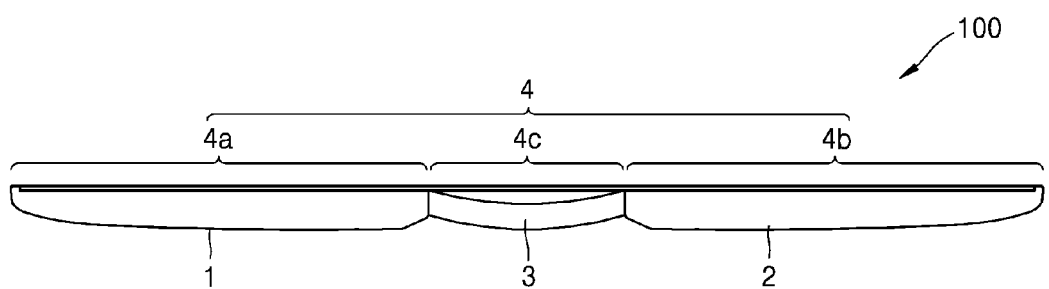
FIG. 24 is a side view of an electronic device, illustrating an example where a space between a flexible display element and the hinge unit is widened as the hinge unit is warped.

In this configuration, when the angle adjustment post 73 is located at the first locking portion 65-1, the sliding plate 7 is stopped and locked at a first position. The first position corresponds to the unfolded state (first state) of the first and second bodies 1 and 2 of FIG. 2. In the unfolded state, when the hinge unit 3 is slid relative to the first and second bodies 1 and 2 and lengths of outer walls of the hinge unit 3 and the first and second bodies 1 and 2 are increased, the hinge unit 3 is bent outward as shown in FIG. 24. Accordingly, the third portion 4c of the flexible display element 4 is not supported by the hinge unit 3 and a space between the third portion 4c of the flexible display element 4 and the hinge unit 3 is widened. In this state, when a pressing force is applied to, for example, the third portion 4c of the flexible display element 4, the flexible display element 4 may be damaged. Also, when a touch panel function is added to the flexible display element 4, a touch sensitivity of the third portion 4c may be degraded. In the present exemplary embodiment, in order for the angle adjustment post 73 to be moved from the first locking portion 65-1 to the second locking portion 65-2, the angle adjustment post 73 has to pass through the concave portion 65a. To this end, a force great enough for the angle adjustment post 73 to widen the concave portion 65a has to be applied to the first and second bodies 1 and 2. Hence, unless the force is applied, the hinge unit 3 may not be slid relative to the first and second bodies 1 and 2, the first and second bodies 1 and 2 may be maintained in the unfolded state of FIG. 2, and the flexible display element 4 may be stably supported by the hinge unit 3.

When the angle adjustment post 73 is located at the third locking portion 65-3, the sliding plate 7 is stopped and locked at a third position. The third position corresponds to the completely folded state (third state) of the first and second bodies 1 and 2 of FIG. 3.

Also, when the angle adjustment post 73 is located at the second locking unit 65-2, the sliding plate 7 is stopped and locked at a second position. The second position corresponds to a state (second state) in which the first body 1 and the second body 2 form the unfolding angle AG as marked by a solid line of FIG. 20.

In this configuration, the first and second bodies 1 and 2 may be locked in the completely unfolded state, the completely folded state, and the state in which the unfolding angle AG is formed between the completely unfolded state and the completely folded state.

Although there is only one position between the completely folded state and the unfolded state, the present exemplary embodiment is not limited thereto. The first and second bodies 1 and 2 may be locked at two or more unfolding angles AG by locating a plurality of the second locking portions 65-2 between the first and second locking portions 65-1 and 65-3.

According to an electronic device of the one or more exemplary embodiments, a flexible display element may be protected from being overly bent in a folding process. Because folding is allowed only in one direction, the flexible display element and the electronic device may be prevented from being damaged due to folding in the opposite direction. Because a hinge unit and two bodies are slidably connected to each other, natural (or easy) folding is possible. An unfolding angle between the two bodies may be adjusted by locking the hinge unit during sliding. Because the hinge unit is locked to prevent it from sliding relative to the two bodies in a completely unfolded state, the flexible display element may be stably supported in a state where the two bodies are completely unfolded.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electronic device comprising:
   a flexible display comprising a first portion, a second portion, and a third portion between the first portion and the second portion;
   a first body for supporting the first portion of the flexible display;
   a second body for supporting the second portion of the flexible display;
   a hinge unit for foldably connecting the first body and the second body; the hinge unit comprising:
      a flexible support member; and
      a plurality of slit members, each of the plurality of slit members comprising a fixed end fixedly connected to the flexible support member and a free end extending from the flexible support member which supports the third portion of the flexible display; and
   a plurality of gap-widening prevention members connecting free ends of adjacent slit members among the plurality of slit members,
   wherein when the first body and the second body are folded, a distance between free ends of the plurality of slit members changes, and
   wherein when the first body and the second body are opened the gap-widening prevention members prevent the distance between the free ends of the adjacent slit members from being greater than a predetermined distance.

2. The electronic device of claim 1, wherein each of the plurality of gap-widening prevention members comprises a pair of wing portions and a connector which connects the pair of wing portions, and
   wherein the adjacent slit members are movably disposed between the pair of wing portions.

3. The electronic device of claim 2, further comprising:
   a first recess and a second recess that are recessed inward from outer surfaces of a first slit member of the plurality of slit members and a second slit member adjacent to the first slit member and receives the pair of wing portions.

4. The electronic device of claim 3, wherein an outer interval between the pair of wing portions is equal to or less than a sum of an interval between the first slit member and the second slit member and thicknesses of the first slit member and the second slit member.

5. The electronic device of claim 2, wherein each of the plurality of the slit members comprises:
   a slot into which the connection portion is inserted; and
   a protrusion that is configured to protrude inward from at least one of both side walls of the slot and prevent the connection portion from being separated from the slot.

6. The electronic device of claim 5, wherein a distance between the protrusion and a bottom of the slot permits the connection portion to be moved in an insertion direction into the slot.

7. The electronic device of claim 2, wherein the plurality of gap-widening prevention members are integrally formed with the slit members.

8. The electronic device of claim 7, wherein each of the plurality of gap-widening prevention members comprises:
   a connection portion that extends from a first slit member of the plurality of slit members to a second slit member that is disposed adjacent to the first slit member; and
   a wing portion that is disposed on an end portion of the connection portion and restricts the second slit member from being spaced apart from the first slit member, wherein a recess that is recessed inward from an outer surface of the second slit member and receives the wing portion is formed in the outer surface of the second slit member.

9. The electronic device of claim 8, wherein the second slit member comprises:
a slot into which the connection portion is inserted; and
a protrusion that protrudes inward from at least one of both side walls of the slot and prevents the connection portion from being separated from the slot.

10. The electronic device of claim 9, wherein a distance between the protrusion and a bottom of the slot permits the connection portion to be moved in an insertion direction into the slot.

11. The electronic device of claim 1, wherein each of the plurality of gap-widening prevention members comprises a wire that connects the adjacent slit members.

12. The electronic device of claim 1, wherein the hinge unit is slidably connected in the longitudinal direction of the flexible display to at least one of the first body and the second body.

13. The electronic device of claim 12, wherein a sliding groove that extends in the longitudinal direction is formed in at least one of the first body and the second body, and
wherein at least one of both ends of the hinge unit are inserted and slid into the sliding groove.

14. The electronic device of claim 13, wherein both ends of the hinge unit are supported by a pair of holders disposed on both sides in a longitudinal direction, and a sliding rail which is inserted and slid into the sliding groove is provided on at least one of the pair of the holders,
the electronic device further comprising:
a stopper provided on at least one of the one pair of holders, and
a projecting ridge provided on at least one of the first and second bodies, and is configured to prevent the hinge unit from being separated from the first and second bodies by catching the stopper.

15. The electronic device of claim 12, further comprising:
a sliding plate that is coupled to the hinge unit; and
a sliding frame that is coupled to at least one of the first and second bodies, and by which the sliding plate is slidably supported.

16. The electronic device of claim 15, further comprising an unfolding angle adjustment unit that is configured to stop the sliding plate at one or more positions during sliding.

17. The electronic device of claim 16, wherein the unfolding angle adjustment unit is configured to stop the sliding plate at a first position that corresponds to a state where the first and second bodies are completely unfolded, and at least one second position between the state where the first and second bodies are completely unfolded and a state where the first and second bodies are completely folded.

18. The electronic device of claim 17, wherein the unfolding angle adjustment unit comprises:
an angle adjustment post that is provided on the sliding plate; and
an angle adjustment slot that is provided in the sliding frame so that the angle adjustment post may be inserted into the angle adjustment slot to be slid, and comprises first and second locking portions that have a slot width configured to lock the angle adjustment post at the first and second positions and concave portions that are disposed between the first and second locking portions and have a slot width less than the slot width of the first and second locking portions.

19. The electronic device of claim 1, wherein the third portion is bent to correspond to a shape of the free ends of the plurality of the slit members.

20. The electronic device of claim 1, wherein the first body comprises a first support plate coupled to the first portion and a first housing coupled to the first support plate, and
wherein the second body comprises a second support plate coupled to the second portion and a second housing coupled to the second support plate.

* * * * *